Dec. 29, 1964   J. SAYERS   3,163,792
ELECTRICAL LIQUID BRUSH DEVICES IN A DYNAMOELECTRIC MACHINE
Filed Jan. 27, 1961   2 Sheets-Sheet 1

Dec. 29, 1964 J. SAYERS 3,163,792
ELECTRICAL LIQUID BRUSH DEVICES IN A DYNAMOELECTRIC MACHINE
Filed Jan. 27, 1961 2 Sheets-Sheet 2

United States Patent Office 3,163,792
Patented Dec. 29, 1964

3,163,792
ELECTRICAL LIQUID BRUSH DEVICES IN A DYNAMOELECTRIC MACHINE
James Sayers, 25 Twatling Road, Barnt Green, England
Filed Jan. 27, 1961, Ser. No. 85,317
Claims priority, application Great Britain, Feb. 5, 1960,
4,095/60, 4,096/60, 4,098/60
19 Claims. (Cl. 310—102)

This invention relates to rotary electrical machines incorporating one or a plurality of electrical brush devices of the kind wherein a quantity of electrically conductive liquid is maintained during operation of the machine in a gap between relatively rotatable conductor members at one pair of opposed boundaries of the gap. Such machines are hereinafter referred to as being of the kind specified.

This application is a continuation-in-part of my co-pending applications Serial No. 822,483, filed June 24, 1959, now Patent No. 3,133,216, and Serial No. 822,607, filed June 24, 1959, now Patent No. 3,084,269.

Primarily, but not exclusively, the invention is applicable to an electrical machine of the kind specified in the form of a transmission device comprising two homopolar electrical machines having respective stators formed as parts of a common stator structure and having relatively rotatable rotors forming the input and output elements of the device, the rotors being included in an electrical circuit interlinked with respective magnetic circuits of the two homopolar machines and containing electrical brush devices comprising said relatively rotatable conductor members and electrically conductive liquid, such brush means being operative between successive relatively rotatable portions of the machine through which said electrical circuit extends, means being provided for varying the flux in at least one of said magnetic circuits. Such transmission devices are hereinafter referred to as being of the kind specified.

When the rotary part or parts of a rotary electrical machine of the kind specified are stationary, the liquid tends to flow gravitationally out of the brush devices to the lowest part of the interior space of the machine.

When the machine is brought into operation after a period of rest the liquid may distribute itself (as a result of being subjected to centrifugal force by contact with one or more rotating parts of the machine) unequally between the various brush devices with a result that one or more of these may be starved of liquid and hence provide a reduced area of contact between the relatively rotatable conductor members and the liquid whilst other brush devices may be overfilled and the liquid may be expelled into parts of the machine where it may have a deleterious influence.

One object of the present invention is to overcome or reduce these difficulties.

According to the invention a rotary electrical machine of the kind specified is characterised in that two or more of the brush devices are connected with each other by a passageway to form a circuit along which the liquid can travel from one brush device to the other or others so that each has a sufficient quantity of liquid maintained therein during operation of the machine.

The quantity of liquid present may be sufficient to fill all the so connected brush devices but less than that which would also fill the passageway.

The brush devices may be situated at different radial distances from a common axle of rotation and circulation of the liquid may be brought about by forming one or more in-flow branches of the passageway leading from a radially outer brush device to a radially inner brush device in a downwardly extending direction and in a non-rotating part of the machine, and one or more out-flow branches of the passageway in or in contact with a rotating part of the machine.

Each brush device may be connected with two branches of the passageway for inlet and outlet of liquid respectively the latter branch communicating with the brush device at the inner radial boundary of a retaining ring acting as a dam or seal in the brush device.

This retaining ring, which is normally rotatable with one of the conductor members, may either be maintained in sliding contact under pressure with the other of the conductor members or may have a clearance with respect thereto if acting as a dam rather than a seal.

If the retaining ring is disposed at one of the axial boundaries of the gap to which access is difficult or impossible in the assembled machine it cannot readily be assembled after the conductor members have been brought into their proper relative positions. If it is pre-assembled with one of the conductor members and made of deformable material so as to be capable of being displaced and reverting to its proper shape or position after the other conductor member is moved into its proper position relative to the first conductor member it may become damaged or its service life impaired. This is especially so if upon reversion to its proper shape or position the retaining ring is required to be maintained by virtue of its own resilience in sliding pressure contact with the conductor member relatively to which it rotates because the additional stressing involved in assembly must then necessarily be higher than the final value.

Furthermore in this last mentioned case allowance would have to be made for some relaxation of pressure during the service life of the retaining member so that the initial contact pressure early in the service life would have to be higher than that strictly necessary with resultant increase in wear and generation of heat at a locality at which this particularly to be avoided.

Some of these difficulties also occur when the retaining ring is disposed at a radial boundary of the gap (the conductor members being situated at opposite axial boundaries).

A further object of the present invention is to avoid or reduce these difficulties.

The retaining ring may thus be carried by or otherwise associated with one of the conductor members and disposed at one at least of the other pair of opposed boundaries of the brush device concerned which is characterised in that the retaining ring is formed or constructed so as to be movable in response to relative rotation of the conductor members to increase its contact pressure or decrease its clearance with respect to the other of the conductor members.

Preferably the retaining ring is made of deformable material and is movable as aforesaid in response to pressure exerted thereon and generated centrifugally. The centrifugally generated pressure may be set up in the liquid by virtue of rotation thereof in the brush device.

In my co-pending application Serial No. 822,483, now Patent No. 3,133,216, there is disclosed a device of the kind specified wherein the conductor member which is made of a material of solid form incorporates at its current communicating face a barrier layer of electrically conductive material in solid form which does not form an amalgam with or otherwise react physically or chemically with the electrically conductive liquid so that destructive erosion of such conductor member by the liquid is avoided or reduced, the outer surface of the barrier layer being coated with a further layer (herein termed the "wetting layer") of electrically conductive material which is wetted by the liquid, or being treated with a flux or etching agent to promote wetting by the liquid.

The term "wetted" as used therein and hereinafter means that when a quantity of the liquid occupying a smaller area than that afforded by the current communicating face of the conductor member is in contact with such face, the included angle defined between a line drawn in the plane of said face at the perimetrical boundary of the liquid and a tangent to the surface of the liquid at the point of intersection between the first said line and the said boundary is zero or nearly zero. In practice the angle concerned which is normally termed the "angle of contact" is such that in the margin adjacent to said boundary the thickness of the liquid layer reduces to molecular dimensions.

In the specific form of device of the kind specified as disclosed in my said co-pending application, the conductor member of solid material may be formed of copper, the barrier layer of nickel, and the wetting layer of copper.

Whilst this is superior in performance to those which have been previously proposed and which do not embody barrier layers we have found that still further improvements can be attained by a further feature of the present invention as hereinafter more fully disclosed.

This improvement consists in the feature that the barrier layer includes at its outer face a layer of rhodium. Preferably the barrier layer comprises a layer of nickel beneath the rhodium layer.

The electrically conductive liquid may be or may include mercury brought into contact with a wetting agent, a quantity of which becomes dissolved in the mercury so that the latter is capable of wetting the exposed surface of the rhodium layer repeatedly when the device is in use. The preferred wetting agent is palladium.

In machines of the kind specified the electrically conductive liquid although maintained during operation of the machine in said gap, is not necessarily permanently situated only in said gap and may either incidentally or deliberately be disposed in other parts of the machine either during operation thereof (in a case where the liquid circulates or is transferred to one brush device to another), or when the machine is out of operation. When the machine is out of operation the relatively rotatable conductor members are stationary and the electrically conductive liquid will normally descend to the lowest part of the interior space afforded by the machine.

When the electrically conductive liquid is disposed out of said gap it is desired to prevent it being contaminated by contact with materials which are reactive chemically or physically with the liquid, and in the case of mercury, which is the most suitable liquid to employ, it is especially desirable that the mercury shall be prevented in coming into contact with either copper (which forms an amalgam in mercury) or copper to which only the barrier layer of nickel has been applied.

In the latter case we have observed that under certain conditions (when moisture is present in the interior space of the machine in the form of water vapour) an oxide film tends to form at the interface between contacting mercury and a nickel surface. This may lead to the setting up of high resistance at the current communicating faces of the conductor members. Further this phenomenon may eventually destroy the protective barrier layer of nickel which would result in exposure of the underlying copper which is normally employed for the electrically conductive parts of the machine, which would lead to deterioration at a very much quicker rate.

Thus according to this further modification or improvement the exposed faces in the interior space of the machine through which the electrically conductive liquid consisting of or comprising mercury can travel or occupy other than current communicaing faces of the conductor members has applied thereto a layer of a material which is unreactive physically with mercury under all conditions of use. The preferred material is chromium.

Beneath the chromium layer may be an inner layer of nickel. These two layers together form the barrier layer.

In practice it is found that mercury will not "wet" a chromium surface easily, but this surface is very highly resistant to the establishment of any chemical or physical reaction with the mercury.

The invention will now be described by way of example with reference to the drawings filed with the provisional specification wherein.

Figure 1:
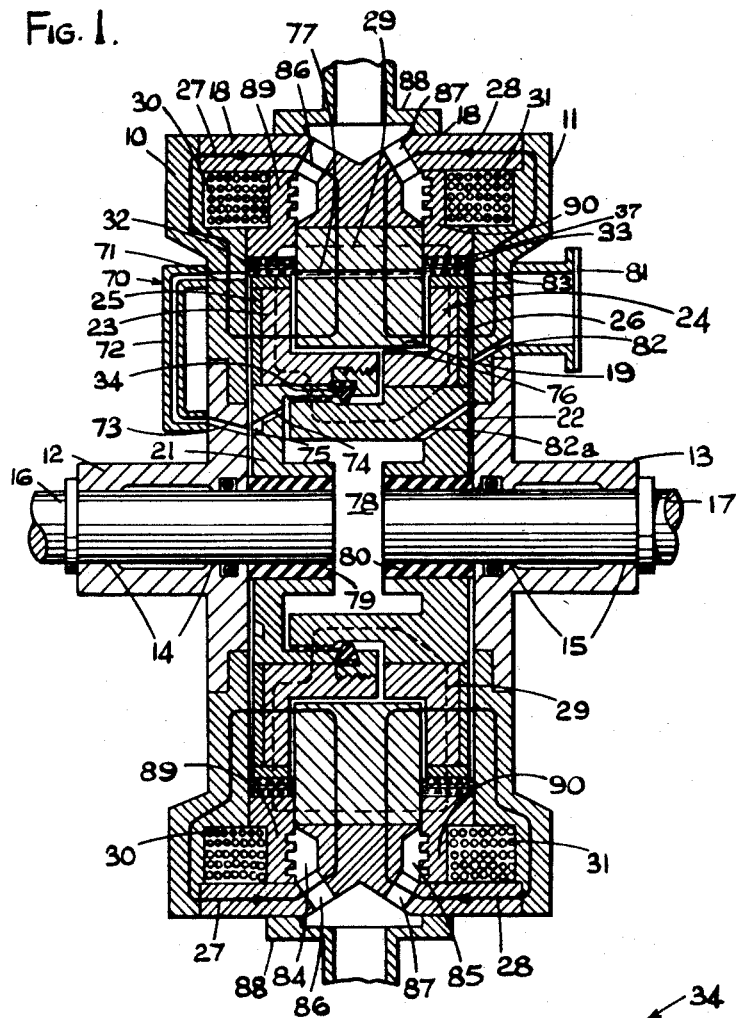
FIGURE 1 shows in diametral cross-section one construction of transmission device comprising two homopolar electrical machines and embodying the invention.
Figure 2:
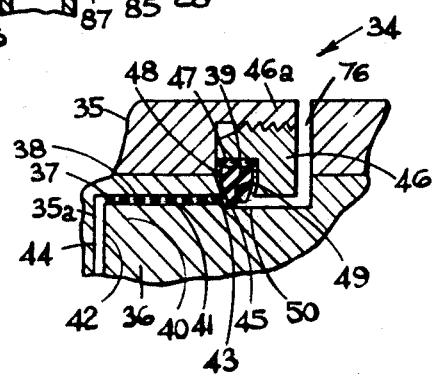
FIGURE 2 is a fragmentary view in cross-section on an enlarged scale showing a construction and arrangement of the inner brush device.

Referring firstly to FIGURES 1 and 2, the transmission device comprises a stator structure which is common to the two homopolar machines and which includes end plates 10 and 11 of magnetic material such as mild steel provided at their centres with bearing housings 12 and 13 of non-magnetic material such as brass or other suitable metal in which housings are provided bearings 14 and 15, and seals (not shown) establishing a hermetically sealed relation between input and output shafts 16 and 17 and the stator structure.

The stator structure further comprises a cylindrical yoke 18 of mild steel which includes an inwardly projecting pole piece 19 of laminated construction, the laminations consisting alternatively of mild steel and copper and lying in radial planes passing through the axis of the machine or, if desired, skewed in relation to the axis or possibly tangential to a pitch circle centred on the axis.

The machine incorporates two rotors, namely an input rotor 21 and output rotor 22.

These both embody armature parts 23 and 24 respectively which are of laminated construction embodying laminations of mild steel and copper arranged in planes such as these referred to in connection with the stator structure and provided at their outer axial faces with sheet steel pole pieces 25 and 26.

As more fully disclosed in my co-pending application Serial No. 822,607, now Patent No. 3,084,269, this arrangement of stator structure and armature parts establishes two magnetic circuits as indicated by the full lines 27 and 28, and an electrical circuit interlinked with both these magnetic circuits as indicated in broken lines 29. The relative values of magnetic flux in the circuits 27 and 28 are controlled by current in energising windings accommodated in annular cavities 30 and 31 thereby providing for torque and velocity conversion as between the rotors, and hence the input and output shafts 16 and 17.

Completion of the electrical circuit 29 as between the relatively rotatable armature parts and the associated parts of the common stator structure is effected by the provision of two outer electrical liquid brush devices 32 and 33 and an inner electrical liquid brush device 34.

The inner brush device comprises an outer conductor member 35 (FIGURE 2) carried by the armature part 23 (although this latter is omitted from FIGURE 2 for the sake of clarity) and connected electrically thereto, and an inner conductor member 36 carried by and connected electrically to the armature part 24.

The conductor member 35 has a radially inwardly directed face 38 which forms the outer radial boundary of a gap in which electrically conductive liquid 37, such as mercury, is disposed, the gap being bounded at opposite ends by a radially inwardly extending portion 35a on the outer conductor member, and a radially inwardly extending retaining ring 39 between which the outer conductor member thus presents a channel-shaped recess having its mouth directed radially inwardly.

The inner conductor member 36 includes a projecting part 40 which enters into that part of the channel-shaped recess adjacent to the mouth, and has a current communicating face 41 opposed to the face 38, both these faces being of cylindrical form and spaced apart by a distance such that the requisite thickness of mercury intervenes between the two faces.

Between the laterally directed faces 42 and 43 of the projecting part 40 and the opposed faces of part 35a and the retaining ring 39, inlet and outlet passageway branches 44 and 45 are formed which extend towards the axis of rotation about which the armature parts can rotate.

Consequently, a quantity of mercury 37 tends to be retained in the gap when relative rotation is set up between the armature parts because the body of mercury contained in the gap will also rotate, and pressure generated centrifugally therein will tend to prevent the mercury passing down the outlet branch 45.

The projecting part 40 of the inner conductor member is an interference fit with the assembly of conductor member 35 and retaining ring 39 considered as a whole, in that the latter assembly cannot be interengaged or withdrawn with respect to the inner conductor member in the axial direction without bringing the inner part of the retaining ring 39 into contact with the projecting part 40.

Although the retaining ring is held in position by an externally screw-threaded ring 46 which co-operates with an internal screw-thread on an axially projecting flange 46a of the outer conductor member, it is not possible conveniently to assemble the retaining ring 39 in position after the inner and outer conductor members 35 and 36 have been brought into assembled relationship as shown in FIGURE 2, because access cannot conveniently be had to the ring 46 for the purpose of screwing it home into its proper position.

For this reason the retaining ring 39 has its outer part disposed loosely in a chamber 47 formed between the ring 46 and the remaining part of the outer conductor member 35.

This chamber has side walls 48 which diverge from each other in an outward radial direction, and the outer part of the retaining ring 39 is also of divergent cross-section in this direction, and is of a maximum width measured axially which exceed the width of the mouth presented radially inwardly by the chamber 47.

The head-room provided between the outer boundary of the retaining ring 39 and the outer wall of the chamber 47 is sufficient to allow the retaining ring to be expanded radially in the chamber 47 so that its inner boundary can pass over the projecting part 40 without encountering that degree of resistance which would be encountered were the retaining ring held rigidly at its outer part and subjected to radial compression in the course of this assembly operation.

When the machine is in operation and relative rotation is established between the conductor members 35 and 36, the mercury 37 in the gap tends to move outwardly to occupy the chamber 47, and being of greater specific gravity than that of the material of which the retaining ring 39 is composed, urges the latter inwards towards the axis of rotation so that the inner boundary face 49 of the retaining ring is brought into contact with the opposed sealing face 50 of the inner conductor member. Alternatively it is brought closer to but still spaced from this face 50 so as to provide the requisite radial depth of the outlet passageway 45, the retaining member then acting as radially inwardly projecting dam effective to retain the required quantity of mercury at 37 in the gap.

The retaining ring 39 may be made of synthetic rubber or other resiliently deformable material preferably non-magnetic.

Alternatively it could be a metallic ring which is split at one or more positions along its circumference to permit of radial expansion and contraction of the ring as a whole, the adjacent ends of the segments thus formed abutting or possibly interfitting with each other.

When the machine is out of operation or either of the rotors is stationary the mercury will, however, not be subjected to centrifugal force and will therefore tend to collect in the lowest part of the machine to which it can flow, for example, the space afforded by and adjacent to those parts of the brush devices 32 and 33 which lie in the lower half of the stator structures.

When the machine is again brought into operation and rotation of the rotors commences, the mercury will tend to be moved back into the brushes 32, 33, and 34 and connecting passageway (hereinafter referred to) exclusively, but the quantity of mercury present in each will not necessarily be the proper amount just to fill the space between the opposed current communicating faces of the inner and outer conductor members, and some of the brushes may contain excess mercury, whilst others are deficient.

To overcome this problem duct means are provided whereby mercury may pass from one brush device to another continuously, each device being thus maintained filled with mercury only to the proper extent.

Thus, the duct means may afford a passageway comprising an in-flow branch indicated generally at 70 formed partly by a bore 71 through the stator plate 10 terminating at its inner end adjacent to the inner boundary of the mercury containing space of the brush 32 partly by external tube 72 leading from this bore to a further bore 73 situated nearer to the axis and extending through the bearing housing 12, and partly by one or more bores 74 extending from a circumferential groove 75 in the axial face of the rotor 21, through the inner part of the rotor 21 so as to terminate at a position adjacent to the inner boundary of the mercury containing space of the inner brush 34.

A further part of the passageway comprises an out-flow branch formed by an interfacial space 76 between the two rotors, to which space mercury in excess to that required in the inner brush 34 can pass under the control of the retaining ring 39.

When the retaining ring 39 is so dimensioned that in its operative position i.e. when it is expelled to its innermost position as limited by the walls of the chamber 47 its inner boundary is still spaced radially from the opposed sealing face 50 of the conductor member 36, the retaining ring will be acting as a dam and excess mercury can flow relatively freely past its inner boundary. When the arrangement is such that when the retaining ring is in its operative position its inner boundary face is in pressure contact with the sealing face 50 of the inner boundary member, mercury will by-pass the retaining ring into the space 76 when the pressure of mercury in the gap exceeds a predetermined value and this can arise if an excess quantity of mercury collects in the inlet passageway 44 of the gap 37.

In this case also therefore the retaining ring will operate to maintain a predetermined quantity of mercury in the gap 37.

It will be evident that mercury will flow radially outwardly in the space 76 dividing in a random manner to arrive at the inner boundary ends of the mercury containing gaps of the two outer brush devices 32 and 33.

These two outer brush devices are connected by a further branch of the passageway in the form of one or more bores 77 extending through the pole piece of the stator and having their ends again situated adjacent to the inner boundaries of the gaps.

Circulation through the passageway takes place as follows. If, for example, an excess of mercury is contained in the brush device 32 it will tend to be delivered into the bore 71 in the adjacent stator plate, and once having become situated in this bore it will descend gravitationally to the bore 73 through the tube 72 since these parts are stationary and will find its way into the entrance groove 75 of the bores 74 which are rotating.

Practically all the mercury thus delivered will pass into the groove 75 and since the bore 74 inclines outwardly as well as axially the mercury will be subjected to centrifugal pressure in a direction from left to right along the bore 74 as seen in FIGURE 1, and will be delivered to the inner brush device 34 to make good any deficiency therein. The mercury in excess of that required by the brush 34 will ultimately find its way to the interfacial spaces 76 as already described and would thence be expelled centrifugally.

Any excess of mercury in the brush device 33 would pass along the bore 77 back to the first outer brush 32, and any excess in the latter would tend to be re-circulated along the passageways as already described.

Consequently each brush device will after a short period of operation receive its full complement of mercury. The quantity of mercury present, however, is preferably made only slightly greater than that necessary to fill each brush and consequently mercury progressing along the passageway is broken up into droplets and no continuous electrical path exists along these passageways between the various brushes. Even if such a path were set up its electrical resistance would be high compared with that of the path 29 and the operation of the device would not be significantly impaired.

It will be evident from the foregoing description that the mercury of the various brushes is brought into contact with the walls of the passageways through which it circulates as well as the current communicating faces forming the inner and outer radial boundaries of the brushes themselves. It may also enter the interior space 78 afforded between adjacent ends of the input and output shafts 16 and 17, the sleeves of insulating material 79 and 80 which serve to insulate rotors 21 and 22 respectively from these shafts as well as the faces of the rotors which are presented towards the space 78.

Except for the current communicating faces of the brushes it is not necessary that the mercury should establish good electrical contact with any of the faces with which it is brought into contact either within the space 78 or while circulating through the passageway, but it is important that at these positions the mercury should not react chemically or physically with the material of which the component parts which present these faces are made.

In the drawings certain component parts are made of a magnetic material such as mild steel, certain parts are made of a non-magnetic material such as brass, certain parts are made of an electrically conductive metal such as copper, other parts are composed of laminations of an electrically conductive material of high magnetic reluctance such as copper and a material of low magnetic reluctance but not necessarily low electrical resistance, such as mild steel, and still other parts are made of electrically insulating material.

To avoid unwanted interaction physically or chemically between mercury and the metal parts of the various components which present faces to the passageway and interior space 78, the faces of these parts may have applied thereto a barrier layer of nickel which may be applied by plating (electro-deposition). Typically this layer would have a thickness of about 0.001 inch although this is not critical. The face of the nickel which is presented towards the passageways or interior space 78 has applied to it a further layer of a material, preferably a metal, which is unreactive chemically or physically with mercury under all conditions of use, that is to say, irrespective of whether the atmosphere in the interior spaces of the machine contains water vapour or not, and at any temperature within the range of working temperatures of the machine. The most suitable material for this purpose which I have found is a metal, namely chromium, and this may be applied by plating it onto the exposed layer of nickel. A typical thickness for the chromium layer would 0.0005 inch.

The exposed faces of the insulating sleeves 79 and 80 would not of course require to be coated with the layers of nickel and chromium, but the material of which these sleeves is composed should be selected so that it is chemically and physically unreactive with mercury, and this criterion would also be true of the material selected to form the sealing ring 39. Thus the sleeves 79 and 80 may be made of resin bonded resin and the sealing ring of one of the materials previously mentioned.

The current communicating faces of the conductor members and which form the inner and outer radial boundaries of each brush and which in the case of the inner brush 34 are indicated in FIGURE 2 at 38 and 41 also have applied thereto a composite barrier layer comprising an inner layer of nickel which may have the same thickness as that applied to the faces exposed to mercury and already referred to.

Instead of the further layer of chromium however, there is applied to the exposed face of the nickel layer a layer of rhodium. This forms the outer layer of the composite layer. This metal, like chromium, does not react physically or chemically with mercury under the conditions of use of the machine irrespective of whether water vapour is or is not present in the interior space of the machine and can in the first instance be wetted by mercury without undue difficulty.

After mercury has been brought into and withdrawn from contact with the exposed face of the rhodium layer however a number of times, increasing difficulty is encountered in obtaining satisfactory wetting and this is necessary in order to establish low electrical resistance contact between the mercury and the rhodium layer which is applied to the conductor members of the brush devices.

To overcome this difficulty the mercury is brought into contact with a wetting agent and the metal palladium is found most satisfactory for this purpose.

The contact may be brought about by providing on top of the outer rhodium layers an initial thin layer of palladium which then acts as a wetting layer and becomes dissolved in the mercury which however, then retains the property by being able to wet the rhodium layer even after repeated withdrawals from contact therewith such as occur when the machine is brought out of operation.

Alternatively, a quantity of palladium may be disposed at any convenient position in the circulating passageway along which the mercury travels so that the mercury is brought into contact therewith repeatedly and a quantity of palladium becomes dissolved in the mercury.

Alternatively, the mercury may be allowed to remain in contact with palladium so as to dissolve the requisite quantity thereof before being put into the machine or any of these expedients may be used in combination with each other.

Although the preferred wetting agent is palladium it is contemplated that in general other metals may be employed these being selected to have a high degree of resistance to oxidation or destructive chemical attack in the presence of mercury and of the metals of the barrier layer and some solubility in mercury.

Metals suitable for this purpose are those contained in Group VIII of the Periodic Table (except rhodium).

A de-humidifying chamber 81 is provided on the outer side face of one of the stator plates, for example stator plate 11. This chamber may contain a de-humidifying substance and communicates with the interior space referred to by way of two ducts 82 and 83 extending through the stator plate 11 to communicate with the disc-like space between this plate and the adjacent rotor 22.

Since the inner ends of these ducts are situated at different radii a pressure difference will exist between them due to the entrainment of air or other gas adjacent to the face of the rotor 22 presented towards these ducts, and this air or gas will be caused to circulate flowing into the de-humidifying chamber along the duct 83 and out of it along the duct 82.

It will be observed that the duct 82 inclines upwardly as well as axially from its inner end towards its outer end so that any mercury in the disc-like space which might find its way into the entrance of the duct 82 is discharged back into the disc-like space gravitationally.

The space 78 between the rotors of the machine communicates with the interfacial space between the rotor 22 and the stator plate 11 by way of an extension 82a of the duct 82, this extension being in the form of one or more bores extending laterally radially outwardly through the rotor 22.

This permits of air circulation through the space 78 and consequent drying of air present within this space by the material provided for this purpose in the de-humidifying chamber 81.

The material provided for this purpose may be either silica gell, or preferably anhydrous phosphorous pentoxide, conveniently in the form of capsules.

In order to promote cooling of the mercury and conductor members the stator structure includes at the outer end of the pole piece 19 annular chambers 84 and 85 which communicate through holes 86 and 87 with inlet and outlet headers 88 which are connected to a source of cooling fluid which may be of liquid form, for example air or water.

The chambers 84 and 85 are bounded at their outer sides by extension flanges 89 and 90 of the outer conductor members of the brushes 32 and 33, these flanges being ribbed or finned to promote extensive thermal communication between the cooling fluid and the flanges. If desired the stator structure may include inwardly radially extending bores permitting the cooling fluid to penetrate to a position adjacent to the inner boundary.

It will be observed that the gaps across which magnetic flux is transferred in the flux paths 27 and 28 from the stator to the rotors lie partly in cylindrical planes, i.e. at the inner boundary of the yoke 19, and partly in radial planes, i.e. at the lateral boundaries of the rotors 21 and 22, but in both cases are removed by a substantial distance from the gaps across which electrical current passes from the stator to the rotors in the path 29.

The axial gaps betweens rotors and stator structure can be of relatively uncritical dimensions and larger.

In order to avoid passing the current between the rotors and stator structure through gaps co-incident or sufficiently near the gap across which the main fluxes 27 and 28 pass from stator structure to rotors the cylindrical pole faces between which the flux passes are disposed at a radius which is different from those at which the brushes are situated. Conveniently, as illustrated, the pole faces are situated at a radius intermediate those at which the outer brushes are situated on the winding and the inner brush is situated on the other hand.

Figure 3:
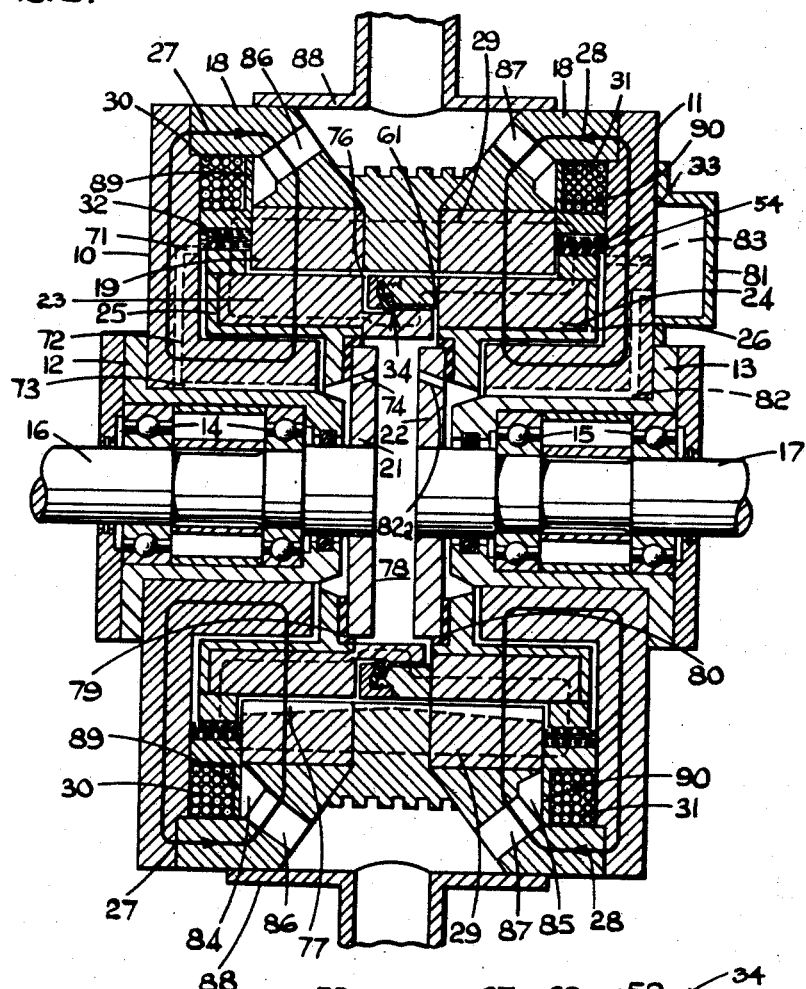
FIGURE 3 is a similar view illustrating an alternative construction.

In the construction illustrated in FIGURE 3 component parts corresponding to those of FIGURE 1 have been designated by like numerals of reference.

One of the differences in this construction is that transmission of the flux 27 and 28 as between the stator structure and the two rotors may be arranged to take place predominantly across gaps bounded by cylindrical surfaces concentric with the shafts 16 and 17. Opposed current communicating faces of the various brushes referred to are also cylindrical or substantially so and concentric with the said axis. This permits the radial gap between the pair of current communicating faces and between opposed pole faces of the stator structure and rotors to be maintained to a high degree of dimensional accuracy with reference only to positioning in radial planes as determined by bearings 14 and 15 adapted to provide journal or radial location.

Another of the main differences in this construction is that the rotors are of substantially cylindrical form instead of being L-shape in cross-section, and the passageway system along which mercury can circulate from the brush device 32 to the brush 34 and thence back to the brush device 33 is formed wholly by bores in the stator plates and the passageways defined between the stator and rotors, instead of employing an external tube.

Figure 4:
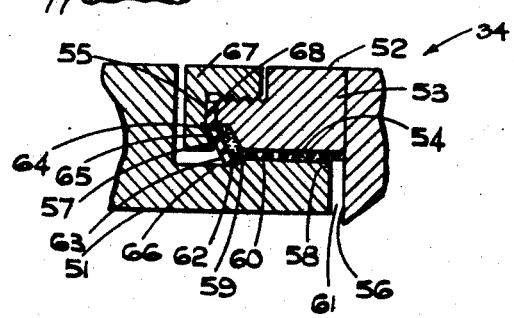
FIGURE 4 is a view similar to FIGURE 2 showing the construction and arrangement of the inner brush device of the machine shown in FIGURE 3.

FIGURE 4 illustrates the alternative form of inner electrical liquid brush device in accordance with the invention employed in the machine shown in FIGURE 3.

In this construction the inner conductor member 51 is carried by and connected electrically to the armature part 23 and the outer conductor member 52 to the armature part 24 respectively.

The conductor member 52 includes a radially inwardly extending portion 53 at one end of a gap in which mercury 54 is disposed, and at the other end of this gap is provided with a retaining ring 55, the laterally inwardly directed faces 56 and 57 of these components serving in combination with the laterally outwardly directed faces 58 and 59 of a projecting part 60 on the conductor member 51 to define inlet and outlet passageways 61 and 62 which extend towards the axis of rotation.

Thus the outer conductor member affords a channel shaped recess presenting its mouth towards the axis whilst the other conductor member has a projecting part entering into this channel-shaped recess adjacent to its mouth. For this reason the two conductor members, together with the retaining ring are an interference fit with each other in the axial direction, and a ring 67 on the outer conductor member and serving to clamp the outer marginal part 63 of the retaining ring against a laterally directed face on the outer conductor member, cannot be screwed home into the latter after the conductor members have been assembled in their correct relative positions owing to inaccessibility.

The inner marginal part 63 of the retaining ring is of frusto-conical form and is inclined towards the axis and towards the central portion of the gap in which mercury 54 is disposed, and adjacent to this marginal part the outer conductor member is recessed to form a chamber 64 which permits the marginal part 63 of the retaining ring to be deflected in a direction which increases the angle between the inwardly presented face 57 and a radial reference plane thereby removing the inner boundary of the marginal part 63 further from the axis and allowing it to pass easily over the projecting part 60.

When the machine is in operation and relative movement is established between the conductor members 51 and 52, the part of mercury 54 in the gap also rotates and tends to enter the chamber 64 producing lateral outward pressure on the face 57 of the marginal part 63 of the retaining ring. This is thus deflected against the outer lateral face 65 of the chamber 64 and in undergoing this deflection which reduces its inclination to the reference plane its inner boundary is moved into contact with, or more closely adjacent to, the sealing face 66 on the inner conductor member 51, so that the retaining ring forms a seal or acts as a dam retaining the required quantity of mercury 54 in the gap.

The retaining ring may be made of rubber synthetic or a flexible plastics material.

Another of the differences in this construction as compared with that of FIGURE 1, is that the extension passageway 82a is inclined laterally outwardly but radially inwardly instead of radially outwardly; this prevents any mercury which may enter the interior space 78 from proceeding along the passageway 82a in preference to entering the inlet to the inner brush device 34. In as much as mercury will in fact be entering this space in circulating from the outer brush device 32 to the inner brush device 34 there will be some inlet of air to the space 78 as a result of the air enclosed by successive droplets or "slugs" of mercury, and excess air is then expelled along the duct 82a so that effective drying of the interior space 78 is achieved.

In both constructions the interior space containing the air or gas which is subjected to drying by the de-humidifying chamber may be pressurised so that it has a pressure somewhat above atmospheric pressure to inhibit any possible leakage of damp air into the interior of the machine.

What I claim then is:

1. In a rotary electrical machine the combination of; a plurality of brush devices each comprising relatively rotatable conductor members disposed at one pair of opposed boundaries of a gap and defining an inlet and an outlet to said gap, an electrically conductive liquid in said gap, and duct means connecting said brush devices in fluid circuit with each other and defining a passageway including branches extending from the outlet of each of said brush devices to the inlet of the next successive of said brush devices in said circuit.

2. In a rotary electrical machine the combination of; a plurality of brush devices each comprising conductor members rotatable relatively to each other about an axis common to all of said brush devices, said conductor members of each brush device being disposed at one pair of opposed boundaries of a gap and defining an inlet and an outlet to said gap, an electrically conductive liquid in said gap, and duct means connecting said brush devices in fluid circuit with each other and defining a passageway including an in-flow branch extending downwardly from the outlet of one of said brush devices to an inlet of another of said brush devices situated radially inwardly of this outlet and formed at least in part in a stationary member of the machine, and including an out-flow branch extending from the outlet of one of said brush devices to the inlet of another of said brush devices situated radially outwardly of this outlet and formed at least in part by a rotary member of the machine.

3. In a rotary electrical machine the combination of; a plurality of brush devices each comprising relatively rotatively rotatable conductor members disposed at one pair of opposed boundaries of a gap and defining an inlet and an outlet to said gap, means at said outlet for substantially retaining a predetermined quantity of an electrically conductive liquid in said gap while allowing excess liquid to flow out of said gap, a quantity of electrically conductive liquid for distribution in such predetermined quantities to each of said gaps, duct means connecting said brush devices in fluid circuit with each other and defining a passageway including branches extending from the outlet of each of said brush devices to the inlet of the next successive of said brush devices in said circuit, said quantity of electrically conductive liquid in said circuit being of a volume only slightly greater than the total of said predetermined quantity in each of said gaps.

4. In a rotary electrical machine the combination of; a plurality of brush devices each comprising relatively rotatable conductor members disposed at opposed radial boundaries of a gap and defining an inlet to said gap at one end thereof, a retaining ring in one of said brush devices extending radially inwardly of said gap from the outer of said conductor members to define between the inner radial boundary of said retaining ring and the inner conductor member an outlet to said gap at the other end thereof, an electrically conductive liquid in said gap, said conductor members and said retaining ring being adapted with respect to each other to substantially retain said liquid within said gap during machine operation, and duct means connecting said brush devices in fluid circuit with each other, and defining a passageway including branches extending from the outlet of each of said brush devices to the inlet of the next successive of said brush devices in said circuit, said conductor members and said retaining ring being further adapted to permit passage through said brush device and to the next successive of said brush devices of any excess of said liquid as would otherwise tend to accumulate within said brush device during machine operation.

5. In a rotary electrical machine the combination of; a plurality of brush devices each comprising relatively rotatable conductor members disposed at opposed radial boundaries of a gap and defining an inlet to said gap at one end thereof, a retaining ring in one of said brush devices disposed at one end of said gap and extending cross-wise thereof and having at least a part movable in a direction from one of said conductor members towards the other, to define between the inner radial boundary of said retaining ring and the inner conductor member an outlet to said gap at the other end thereof, means responsive to relative rotation of said conductor members urging said part of said retaining ring towards said other conductor member, an electrically conductive liquid in said gap, and duct means connecting said brush devices in fluid circuit with each other and defining a passageway including branches extending from the outlet of each of said brush devices to the inlet of the next successive of said brush devices in said circuit.

6. In a rotary electrical machine a brush device comprising relatively rotatable conductor members disposed at one pair of opposed boundaries of a gap, an electrically conductive liquid in said gap, retaining ring means disposed at one end of said gap and extending cross-wise thereof to substantially retain said liquid in said gap, said retaining ring means being adapted whereby at least a part thereof is movable in a direction from one of said conductor members towards the other in response to relative rotation of said conductor members, whereby only the excess of said liquid as would otherwise tend to accumulate within said brush device during machine operation will be permitted to flow past said retaining ring means, and out of said brush device.

7. In a rotary electrical machine a brush device comprising relatively rotatable conductor members disposed at one pair of opposed boundaries of a gap, electrically conductive liquid in said gap, a retaining ring of deformable material disposed at one end of said gap and having a part carried by one of said conductor members and a further part extending cross-wise of said gap towards the other of said conductor members, means defining a chamber disposed at least in part radially outwardly of said gap and in communication therewith to receive liquid moving centrifugally from said gap in response to relative rotation of said conductor member, the further said part of said ring being movable towards said other conductor member in response to entry of liquid into said chamber.

8. In a roatary electrical machine a brush device comprising relatively rotatable conductor members disposed at opposed radial boundaries of a gap, electrically conductive liquid in said gap, a retaining ring of deformable material, means defining a chamber rotatable with one of said conductor members and disposed at least in part radially outwardly of said gap, said ring having a part covered by the last said conductor member and a further part extending cross-wise of said gap towards the other of said conductor members, said ring having a face presented to and in communication with said chamber to be displaced by liquid from said gap flowing centrifugally into said chamber in response to relative rotation of said conductor members to urge said ring towards said other conductor member.

9. In a rotary electrical machine a brush device comprising relatively rotatable conductor members disposed at opposed boundaries of a gap, electrically conductive liquid in said gap, a retaining ring of deformable material, means defining a chamber rotatable with one of said conductor members and disposed at least in part radially outwardly of said gap and in communication therewith and having a mouth presented radially inwardly, said ring having a part disposed in said chamber and a part projecting from the mouth thereof cross-wise of said gap whereby said ring is urged radially inwardly from said mouth in response to centrifugal entry of said liquid into said chamber.

10. In a rotary electrical machine a brush device comprising relatively rotatable conductor members disposed at opposed boundaries of a gap electrically conductive liquid in said gap, means defining a chamber disposed at least in part radially outwardly of said gap to receive liquid moving centrifugally from said gap in response to relative rotation of said conductor members, and including a retaining ring of deformable material at one of the axial boundaries of said chamber, said ring extending cross-wise of said gap at one end thereof, and being deformable in response to centrifugal entry of said liquid into said chamber to retain at least some of said liquid in said gap.

11. In a rotary electrical machine a brush device comprising conductor members rotatable relatively to each other about an axis disposed at opposed radial boundaries of a gap, electrically conductive liquid in said gap, means defining a chamber disposed at least in part radially outwardly of said gap to receive liquid moving centrifugally from said gap in response to relative rotation of said conductor members, and including a retaining ring of flexible material at one of the axial boundaries of said chamber, said ring extending obliquely across said gap with its outer margin disposed axially outwardly of its inner margin whereby said ring is deflected towards perpendicularity with said axis in response to centrifugal entry of said liquid into said chamber.

12. In a rotary electrical machine the combination of; a plurality of brush devices each comprising relatively rotatable conductor members disposed at one pair of opposed boundaries of a gap and defining an inlet and an outlet to said gap, an electrically conductive liquid including mercury in said gap, and duct means connecting said brush devices in fluid circuit with each other and defining a passageway including branches extending from the outlet of each of said brush devices to the inlet of the next successive of said brush devices in said circuit, said duct means incorporating a layer of metal bounding said passageway branches, said metal being physically resistant to erosion by, and chemically unreactive with respect to said liquid.

13. In a rotary electrical machine having a casing affording an interior space containing stator means and rotor means; a brush device comprising relatively rotatable conductor members one of which is rotatable with said rotor means and which are disposed at one pair of opposed boundaries of a gap and define an inlet and an outlet to said gap communicating with said interior space, an electrically conductive liquid including mercury distributed in said interior space and in said gap, a composite layer lining parts of said stator and rotor means exposed to said interior space and comprising an inner layer of nickel and an overlying layer of chromium.

14. In a rotary electrical machine the combination of; a brush device comprising conductor members rotatable relatively to each other about an axis and having current communicating faces disposed at opposite boundaries of a gap, an electrically conductive liquid including mercury in said gap, said conductor members each incorporating at their current communicating faces a composite barrier layer comprising an inner layer of an electrically conductive material which is physically and chemically unreactive with respect to said liquid and an outer layer of rhodium.

15. In a rotary electrical machine the combination of; a brush device comprising conductor members rotatable relatively to each other about an axis and having current communicating faces disposed at opposite boundaries of a gap, an electrically conductive liquid in said gap, said liquid including mercury, said conductor members each incorporating at their current communicating faces a composite barrier layer comprising an inner layer of an electrically conductive material which is physically and chemically unreactive with respect to said liquid and an outer layer of rhodium, and said mercury containing a wetting agent material.

16. In a rotary electrical machine the combination of; a brush device comprising conductor members rotatable relatively to each other about an axis and having current communicating faces disposed at opposite boundaries of a gap, an electrically conductive liquid in said gap, said liquid including mercury, said conductor members each incorporating at their current communicating faces a composite barrier layer comprising an inner layer of nickel and an outer layer of rhodium, said mercury containing palladium.

17. In a rotary electrical machine the combination of; a plurality of brush devices each comprising relatively rotatable conductor members disposed at one pair of opposed boundaries of a gap and defining an inlet and an outlet to said gap, means at said outlet for substantially retaining a predetermined quantity of an electrically conductive liquid in said gap while allowing excess liquid to flow out of said gap, and duct means connecting said brush devices in fluid circuit with each other and defining a passageway including branches extending from the outlet of each of said brush devices to the inlet of the next successive of said brush devices in said circuit.

18. The combination as set forth in claim 14 wherein said composite barrier layer further comprises a layer of palladium overlying said outer layer of rhodium.

19. In a rotary electrical machine the combination of: a brush device comprising conductor members rotatable relatively to each other about an axis and having current communicating faces disposed at opposite boundaries of a gap, means defining a passageway including said gap for retaining a predetermined quantity of mercury, a quantity of palladium disposed within said passageway for contacting by the mercury, said conductor members each incorporating at their current communicating faces a composite barrier layer comprising an inner layer of an electrically conductive material which is physically and chemicaly unreactive with respect to said liquid and an outer layer of rhodium.

References Cited in the file of this patent

UNITED STATES PATENTS

| 1,635,319 | Gill | July 12, 1927 |
| 2,753,476 | Watt | July 3, 1956 |
| 2,828,431 | Klaudy | Mar. 25, 1958 |
| 2,845,554 | Schwab | July 29, 1958 |

FOREIGN PATENTS

| 413,026 | Great Britain | July 12, 1934 |